April 2, 1935.  H. W. PRICE ET AL  1,996,256
CLUTCH CONTROL MECHANISM
Filed Oct. 12, 1931   2 Sheets-Sheet 1
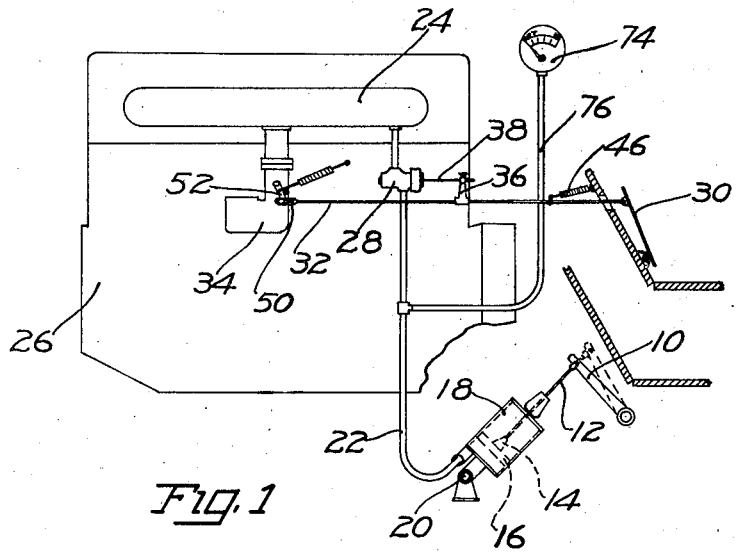
Fig. 1
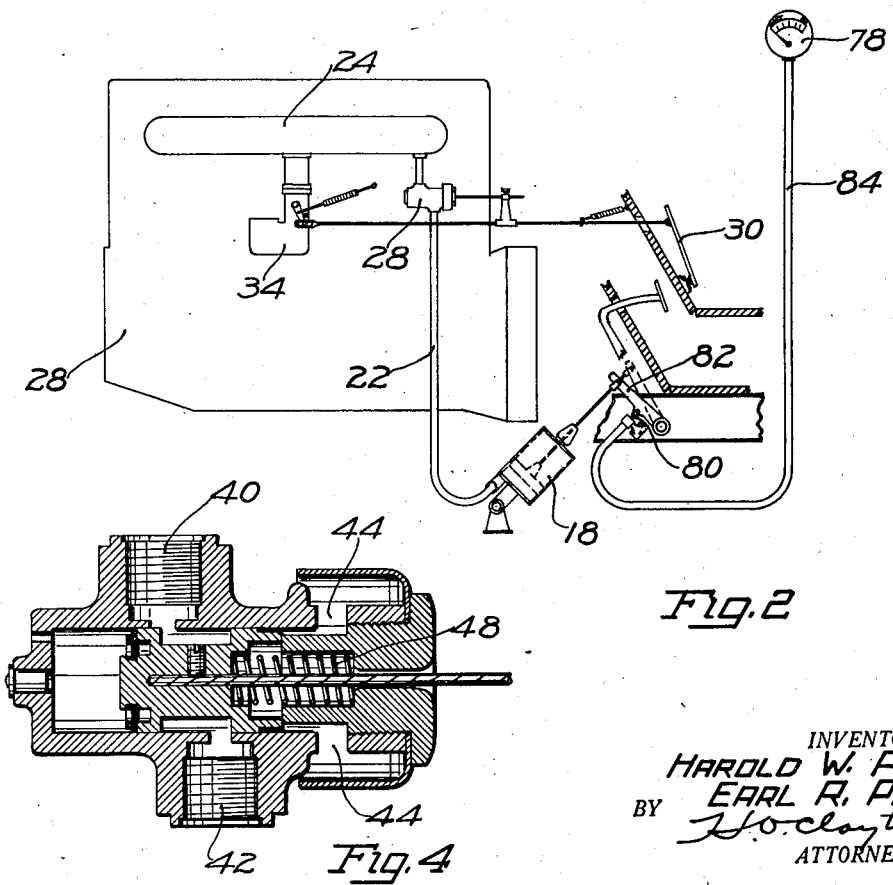
Fig. 2
Fig. 4
INVENTORS
HAROLD W. PRICE
EARL R. PRICE
BY
ATTORNEY

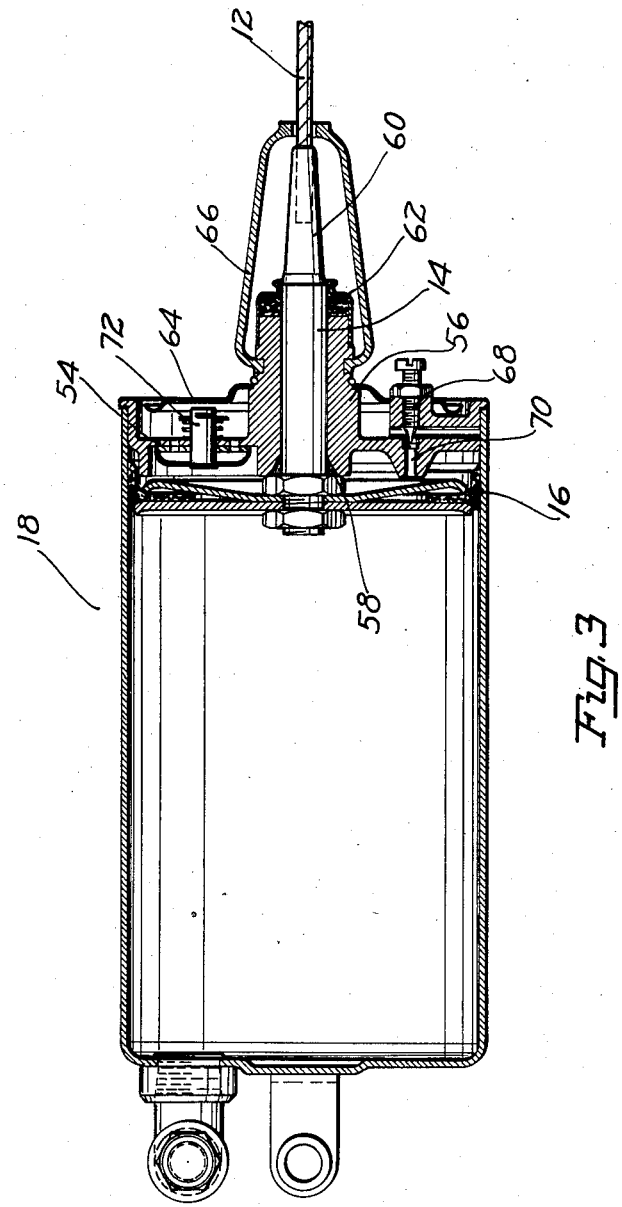

Patented Apr. 2, 1935

1,996,256

UNITED STATES PATENT OFFICE 1,996,256

CLUTCH CONTROL MECHANISM

Harold W. Price and Earl R. Price, South Bend, Ind., assignors to Bendix Aviation Corporation, South Bend, Ind., a corporation of Delaware Application October 12, 1931, Serial No. 568,403

2 Claims. (Cl. 192—.01)

This invention relates in general to control mechanism for an automotive vehicle and in particular to means for controlling the operation of the throttle and clutch.

The invention is particularly designed as an improvement over the accelerator operated throttle and clutch control mechanism disclosed in the patent to Belcia, No. 1,470,272, dated October 9, 1923, wherein actuation of the accelerator pedal effects a synchronized throttle opening and clutch engagement, release of the pedal serving to close the throttle and disengage the clutch.

The aforementioned patent discloses power means for operating the clutch, and the principal object of the present invention is to improve upon the fluid motor of this power mechanism by providing means, incorporated in the motor, for progressively varying the rate of clutch plate engaging movement.

A further object is to provide means of the above character so constructed that the clutch engagement may be rapid during the first part of the movement and relatively slow during the last part of the movement, after the clutch plates have contacted.

A further object is to provide manually adjustable means for changing the mode of operation of the aforementioned clutch regulating means.

Other objects of the invention, including the incorporation, in the power operated clutch controlling means, of indicating means for determining the mode of clutch operation, and other desirable details of construction and combinations of parts will become apparent from the following detailed description of certain preferred embodiments of the invention taken in conjunction with the accompanying drawings, in which:

Figure 1 is a diagrammatic view of the combined clutch and throttle controlling mechanism constituting the invention;

Figure 2 is a similar diagrammatic view disclosing a modified form of the invention;

Figure 3 is a longitudinal sectional view of the power actuator unit; and

Figure 4 is a longitudinal sectional view of the power actuator control valve.

As disclosed diagrammatically in Figures 1 and 2 of the drawings, clutch operating arm 10, supplanting the conventional clutch pedal, is operatively connected, by a cable 12, with the connecting rod 14 of a piston member 16 reciprocable in a double ended cylinder 18, the latter being pivotally mounted at 20 to the chassis. A flexible air transmitting conduit 22 connects one end of the cylinder with the intake manifold 24 of an internal combustion engine 26, a three-way control valve 28 being interposed in the connection. Opening of the valve to place the manifold in circuit with the cylinder serves to evacuate the latter at closed throttle, the manifold at this time being evacuated by the pumping action of the engine cylinders. The weight of the atmosphere, acting on the non-suction side of the piston 16, then moves the piston and its connected clutch arm to disengage the clutch.

The valve 28 is adapted to be opened and closed by means of an accelerator pedal 30, the rod 32, interconnecting the pedal with the carburetor 34, being connected by arm 36 to a flexible valve operating member 38. The valve per se forms no part of the instant invention, being more fully disclosed and described in an application of Victor W. Kliesrath, No. 568,081, filed October 10, 1931. It will suffice here to indicate that the inlet and outlet valve ports 40 and 42, respectively, Figure 4, are registered to energize the fluid motor and disengage the clutch, and that the atmospheric and outlet ports 44 and 42, respectively, are registered to vent the motor and permit the clutch to engage.

The clutch is shown disengaged in Figures 1 and 2 of the drawings, the accelerator pedal being returned to its off position by spring 46, the latter overcoming the weaker valve spring 48 to open the valve and evacuate the motor, as previously described. Depression of the accelerator pedal serves to first open or vent the valve via ports 44 and 42 to thereby vent the suction side of the actuator and permit the clutch spring to reengage the clutch plates. A limited degree of lost motion is provided at 50 between the butterfly valve operating member 52 and the accelerator rod 32, and after this lost motion is taken up the throttle is opened to accelerate the engine. The valve 28 is thus opened after the throttle is completely closed and closed before the throttle opening is initiated.

There is thus provided a conjoint or synchronized operation of the throttle and clutch by a common manually operable means, namely, the accelerator pedal.

The invention is, however, particularly directed to means for controlling the mode of clutch engagement. To this end the cylinder end 54, Figure 3, is provided with a hub portion 56, bored to slidably receive the piston connecting rod 14. The hub is also provided with a cone-shaped recess 58 at the inner end of the bore. The outer end of the rod is provided with a tapered portion 60 slidable within the bore in the hub 56, during the first part of the driving clutch plate movement. Leakage from the cylinder is obviated by gland 62, and guards 64 and 66 are provided to protect the construction.

In operation, actuation of the accelerator pedal to accelerate the engine serves to vent the suction side of the cylinder, as previously described. The conventional clutch spring then functions to reengage the clutch plates. This movement, however, is controlled by the aforementioned construction, the bore of the hub 56 providing a rather rapid efflux of air from the compression side of the piston to insure a quick initial clutch plate movement. As the piston 46 continues its movement the tapered rod end 60 enters the hub to progressively decrease the rate of plate movement by virtue of the decrease in the rate of air efflux.

A manually adjustable needle valve 68, controlling an opening 70 in the cylinder wall 54, may also be provided to vary the mode of air efflux. A check valve 72 is provided to obviate drag upon the piston during its clutch disengaging movement.

There is thus provided a built-in structure adapted to throttle the efflux of air from the compression side of the actuator, the clutch plate movement being decelerated to insure rapid take up during the first phase of clutch plate movement and a slow buffed action during the clutch plate engaging phase.

According to a minor, but nevertheless important, feature of the invention, there is provided, as disclosed in Figure 1, a pressure responsive indicator or gauge 74, tapped into circuit with the conduit 22 by means of a supplemental conduit 76. This gauge, which may be of the spring returned piston type, serves to indicate when the clutch is engaged or disengaged and also indicates the actual movement of the linearly movable driving clutch plate. A similar indicator 78, Figure 2, may be mechanically actuated by a Bowden control, the cable 80 of the control being connected to the clutch operator arm 82, the conduit 84 being connected to the gauge. The operator is thus advised at all times of the condition, as well as the mode of operation, of the clutch controlling mechanism.

Although this invention has been described in connection with certain specific embodiments, the principles involved are susceptible of numerous other applications that will readily occur to persons skilled in the art. The invention is, therefore, to be limited only as indicated by the scope of the appended claims.

We claim:

1. In a power operated clutch controlling mechanism comprising a double ended cylinder of a fluid motor, a reciprocable piston in said cylinder and a connecting rod secured to said piston and slidably received in one end wall of said cylinder, said rod being provided with a tapered end reciprocable in the bore of said end wall.

2. In a power operated clutch controlling mechanism comprising a double ended cylinder of a fluid motor, a reciprocable piston in said cylinder and a connecting rod secured to said piston and slidably received in one end wall of said cylinder, said end wall being provided with a cone-shaped recess in the inner face of said wall, said rod being provided with a tapered end portion reciprocable in said wall.

HAROLD W. PRICE.
EARL R. PRICE.